March 13, 1962 L. PÉRAS 3,024,740
DEVICES FOR DRIVING AND BRAKING CONVEYOR LOADS
Filed March 31, 1958 2 Sheets-Sheet 1
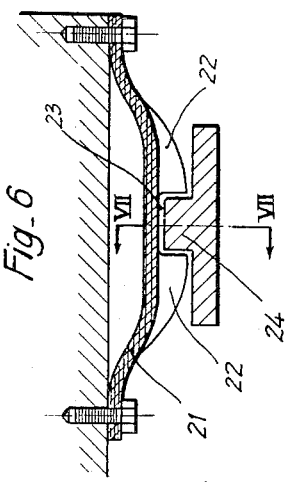
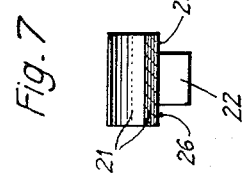
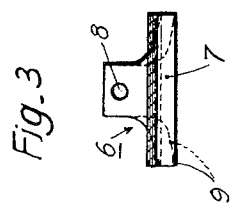
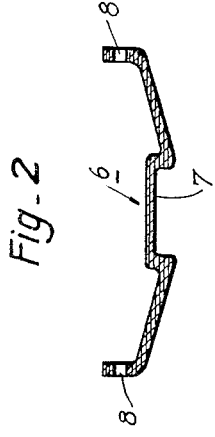
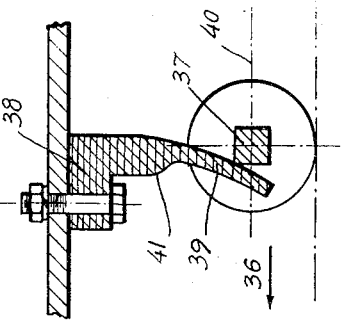
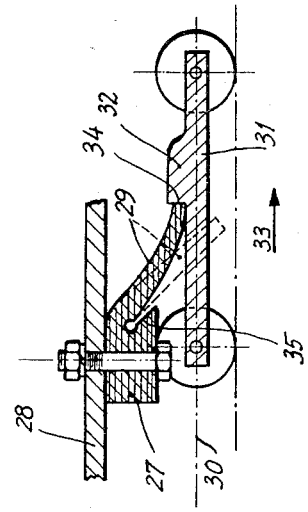
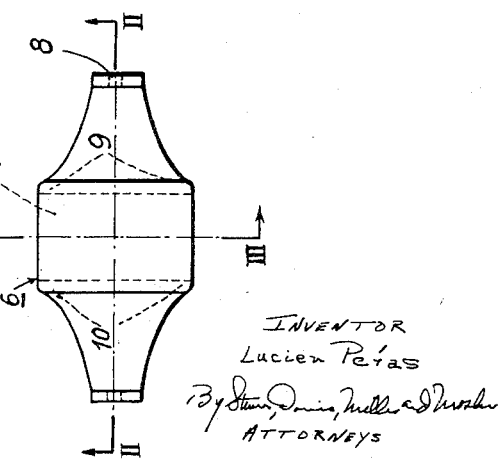

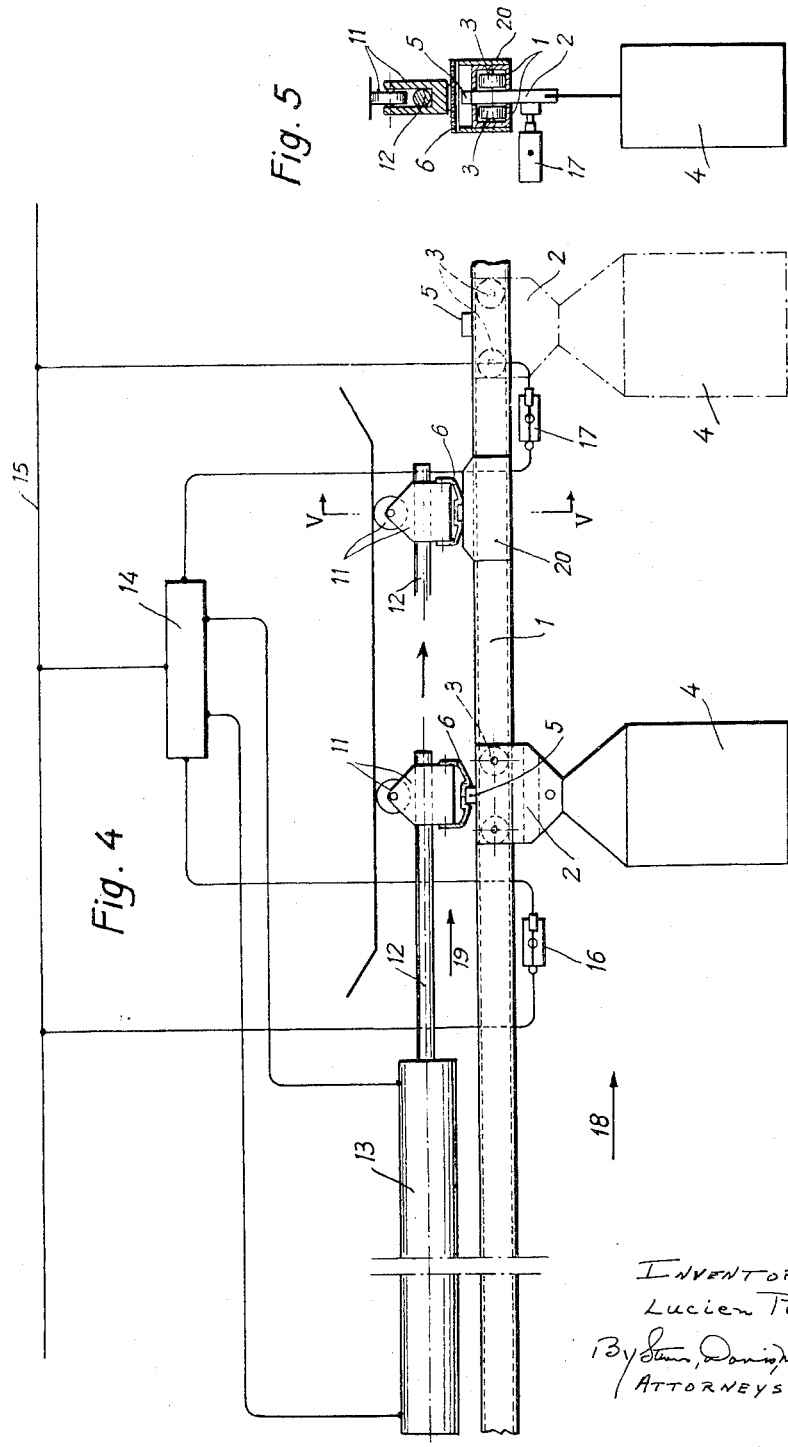

United States Patent Office 3,024,740
Patented Mar. 13, 1962

3,024,740
DEVICES FOR DRIVING AND BRAKING
CONVEYOR LOADS
Lucien Péras, Billancourt, France, assignor to Regie
Nationale des Usines Renault, Billancourt, France
Filed Mar. 31, 1958, Ser. No. 725,412
Claims priority, application France Apr. 5, 1957
3 Claims. (Cl. 104—162)

The present invention relates to members or springs made of resilient plastic material and designed more particularly for driving and/or braking loads transported on conveyors, notably in overhead-trackage conveyors of the type comprising load-carrying trolleys and the like.

This invention aims at providing different types of one-piece springs adapted to exert on the elements displaceable on the conveyor trackage a driving or braking action attended by a uni- or bidirectional coupling therewith and by the possibility of releasing the driving connection in the case of bi-directional coupling, these springs constituting advantageous substitutes for the conventional metal devices made of several component elements.

The springs according to this invention are characterized by a great simplicity of manufacture, for they can be moulded integrally without any additional machining step. Besides, they require no maintenance, unlike conventional devices comprising return springs and pivot pins liable to corrosion.

The devices according to this invention are furthermore noiseless and may be made of a plastic material consistent with their specific conditions of operation in order also to reduce their wear and tear.

In order to afford a clear understanding of the invention and of the manner in which it can be embodied in the practice, different forms of embodiments will be described hereafter by way of example with reference to the accompanying drawings forming part of this specification. In the drawings:

FIGURE 1 is a plane view of a spring providing a bidirectional coupling action;

FIGURE 2 is a longitudinal section of the spring shown in FIG. 1, the section being taken upon the line II—II;

FIGURE 3 is a cross-section of the same spring which is taken upon the line III—III of FIG. 1;

FIGURE 4 is an elevational view showing a device equipped with a spring according to this invention for controlling the movements of the trolleys of an overhead trackage conveyor;

FIGURE 5 is a cross-section of the device illustrated in FIG. 4, the section being taken upon the line V—V;

FIGURE 6 is an elevational view showing a modified embodiment of a bidirectional coupling spring;

FIGURE 7 is a cross-section of the spring shown in FIG. 6, the section being taken upon the line VII—VII;

FIGURE 8 is a longitudinal section of a driving device provided with a unidirectional coupling spring; and FIGURE 9 is a longitudinal section illustrating a braking device equipped with a unidirectional coupling spring.

The bidirectional coupling springs of FIGURES 1–3 will be described hereafter in conjunction with a typical application thereof in the case of an overhead trackage conveyor as illustrated in FIGS. 4 and 5. In these last figures, the reference numeral 1 designates the conveyor track, 2 is the conveyor trolley having wheels 3 and supporting a bucket, container or like load-supporting element 4.

On its upper face the trolley 2 is formed with a projection 5 of the type usually provided for controlling the load displacements; this projection 5 is responsive to the action of various control devices.

The bidirectional coupling spring according to this invention, in the specific embodiment designated by the reference numeral 6 is adapted under predetermined conditions of operation to engage the trolley projection 5 according to the desired control action to be applied thereto.

As illustrated in FIGS. 1 to 5, this spring 6 having the general configuration of a leaf spring is of substantially convex shape on the side of the projection 5 with which it is adapted to co-act; the central portion of this leaf spring is formed for this purpose with a transverse groove 7 having its concavity turned toward the projection and of a width permitting its engagement thereon after the leaf spring has been bent on one or the other side of this groove. This spring is formed at either ends with orifices 8 for its fixation. The shape of the spring is such—at least in its central portion—that it extends laterally beyond the projection co-acting therewith so as to have side faces 9, 10 adaped to be engaged by cam members counteracting the convexity of the spring, to release the projection from the spring at the desired location.

The function of the device illustrated in FIGS. 4 and 5 of the drawings is to retard or accelerate the trolleys during their travel.

The spring 6 is secured on the guide member 11 of a rod 12 of a double-acting cylinder 13. This cylinder 13 is fed with actuating fluid under the control of a distributor 14 connected to the compressed-air supply line 15 and controlled in turn by relay valves 16, 17 actuated by the trolleys as they move past these relay valves.

The device so far described operates as follows:

As the load travels in the direction of the arrow 18 it actuates the relay valve 16 and as a consequence the distributor 14 operates the cylinder 13 to move the rod 12 in the direction of the arrow 19, the trolley projection 5 engaging the central transverse groove of spring 6. Thus, during its outward stroke the cylinder rod 12 drives the trolley through the spring 6 to a position in which a cam member 20 lifts the edges 9, 10 of the spring to release the projection 5 therefrom. Thus the trolley is disengaged relative to the rod 12 and during the next portion of its travel it actuates the relay valve 17 controlling the return movement of the cylinder rod to its initial position.

From the foregoing it is apparent that by properly adjusting the regulating elements of the assembly the conveyor trolleys can be accelerated, retarded or even stopped, provided of course that these trolleys travel by inertia.

The practical application of the spring according to this invention is obviously not limited to the device described hereinabove. Thus, it can be mounted in series on the driving member of the conveyor, trolley, chain or like element, in view of for example driving the trolleys or like load-supporting members with a predetermined relative spacing up to a release point.

FIGURES 6 and 7 illustrate a modified embodiment wherein the convex leaf spring 21 is formed with two longitudinal raised portions 22 in which the transverse groove 23 is formed; as in the preceding example, this groove is adapted to engage the projection 24 of the trolley or like element. FIGURE 7 shows clearly that the leaf spring is wider than its raised portions 22 so that the release cam members may co-act with the side faces 25, 26.

FIGURE 8 illustrates a modified embodiment of the device of this invention which consists of a unidirectional coupling spring comprising a base or block 27 for securing the spring to the driving element 28, for example a conveyor chain or the like, and a blade or arm 29 set at an angle relative to the plane of movement 30 of the load-carrying trolley 31 so as to recede upwardly when it clears the projection 32 of said trolley; the inoperative position of the arm 29 is shown in broken lines.

From the foregoing it is evident that an oncoming trolley moving in the direction of the arrow 33 will lift the arm 29 of the spring which, when the driving member 28 travels in the same direction, is adapted positively to drive the trolley, its arm 29 engaging the rear face 34 of the projection (considered in its thick-line position). Besides, the base or block 27 is formed preferably with a counter-supporting face 35 adapted to prop the arm 29 abutting against the trolley projection; preferably, this arm has a convenient flexibility permitting its deformation by bending as the trolley moves past thereto.

FIGURE 9 illustrates a unidirectional coupling and braking spring suitable for retarding the movement of a member travelling in the direction of the arrow 36, for example a trolley having an axle 37. The spring is formed with a fixation base or block 38 from which a depending arm 39 extends in a direction substantially perpendicular to the plane of travel 40 of the trolley; of course, this arm has its lower portion disposed in the plane of travel of the axle 37 to engage same for the purpose specified.

The arm 39 of the spring is flexible (as illustrated in the figure), its progressive retraction being attended if desired by a certain stiffening or increased resistance to bending which is obtained by making this arm thicker at its bending portion 41.

I claim:

1. For use in coupling a conveyor trolley, which is mounted on an overhead track and which has an upstanding projection, with an overlying driving and control member, a one-piece coupling spring of resilient material having a generally U-shape and having opposing legs adapted to be fixed to the driving and control member and having a bight portion formed with a convex outer side adapted to face the projection and said side having a substantially centrally disposed concavity adapted to receive the projection, cam elements adapted to be carried by the track, said side being wider than the projection and said side having bearing faces on opposite sides of the concavity adapted to engage the cam elements to engage and disengage the projection with the concavity.

2. In combination with a conveyor trolley slidably mounted on an overhead track and having an upstanding projection and a driving and control member overlying the trolley, means for releasably coupling the trolley to the member and including a U-shaped member having opposing ends fixed to the member and a resilient bight portion extending between the ends and having a convex outer side facing the trolley and formed with a cavity receiving the projection and said outer side having lateral bearing faces fore and aft of the cavity in the direction of movement of the trolley and cam means carried by the track and adapted to be engaged by said bearing faces to disengage the cavity from the projection.

3. In combination with a conveyor trolley slidably mounted on an overhead track and having an upstanding projection and a driving and control member overlying the trolley, means for releasably coupling the trolley to the member and including a U-shaped member having opposing ends fixed to the member and a resilient bight portion extending between the ends and having a convex outer side facing the trolley and formed with a cavity receiving the projection and said outer side having lateral bearing faces fore and aft of the cavity in the direction of movement of the trolley and cam elements mounted on the track and having inclined cam surfaces at their opposing ends adapted to be abutted by said bearing faces to flex the bight portion and disengage the cavity from the projection.

References Cited in the file of this patent

UNITED STATES PATENTS

| | | |
|---|---|---|
| 504,581 | Haywood | Sept. 5, 1893 |
| 940,436 | Crockett | Nov. 16, 1909 |
| 1,420,115 | Lange | June 20, 1922 |
| 1,743,782 | Kershaw | Jan. 14, 1930 |
| 1,809,448 | Koster et al. | June 9, 1931 |